& Kratz

United States Patent [19]

Frauen et al.

[11] Patent Number: 4,563,195

[45] Date of Patent: Jan. 7, 1986

[54] METHOD FOR TREATMENT OF TAR-BEARING FUEL GAS

[75] Inventors: Leonard L. Frauen, Murrysville; Stanley Kasper, Pittsburgh, both of Pa.

[73] Assignee: Dravo Corporation, Pittsburgh, Pa.

[21] Appl. No.: 670,170

[22] Filed: Nov. 13, 1984

[51] Int. Cl.$^4$ ............................ C10K 1/02; C10K 1/10
[52] U.S. Cl. ...................................... 48/197 R; 48/190; 48/210
[58] Field of Search ............... 48/190, 197 R, 203, 48/206, 210; 55/10, 11

[56] References Cited

U.S. PATENT DOCUMENTS

| | | | |
|---|---|---|---|
| 1,130,214 | 3/1915 | Steere | 55/11 |
| 1,944,523 | 1/1934 | Miller | 55/10 |
| 3,998,608 | 12/1976 | Livemore | 48/197 R |
| 4,175,929 | 11/1979 | Frumerman et al. | 48/203 |

Primary Examiner—Peter Kratz
Attorney, Agent, or Firm—Parmelee, Miller, Welsh & Kratz

[57] ABSTRACT

Coal tar resulting from the gasification of coal in an industrial gas producer, instead of being discarded as waste, is condensed from the hot fuel gas by a mist-like spray of water to produce a fog-like suspension of tar mixed with the fuel gas. This mixture flows to an electric precipitator where the tar is precipitated and the fuel gas and water vapor are conducted to a mixer while the tar, which has been condensed, is supplied to a tar burner where it is burned either with a stoichiometric volume of air, or less than a stoichiometric volume. The product gases from the tar burner are conducted and discharged hot into the mixer where they supply sensible heat to fuel gas and water vapor and raise the temperature of the mixture above the dew point of the tar remaining in the fuel gas, and from which the hot mixture produced is delivered to a fuel burner or gas consuming apparatus. If insufficient oxygen is supplied to the burner to completely oxidize the tar, the hot product gas from the mixer will contain caloric fuel values such as carbon monoxide and hydrogen which supplement the gas in the mixer with caloric fuel values in addition to sensible heat.

6 Claims, 1 Drawing Figure

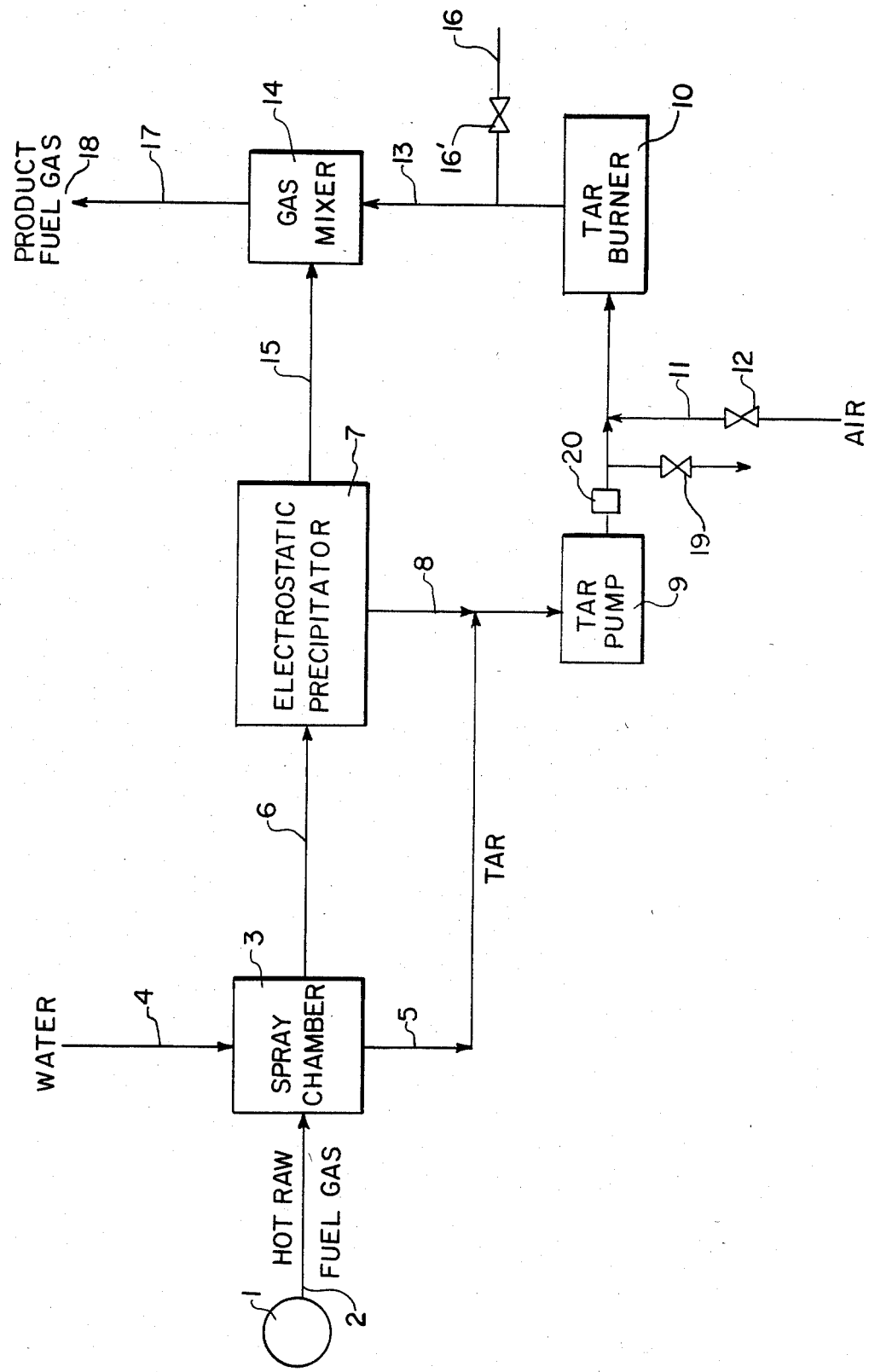

METHOD FOR TREATMENT OF TAR-BEARING FUEL GAS

In many industrial operations requiring the use of gas as a fuel, the gas is generated nearby, usually on the premises, from bituminous coal, lignite, and like combustible materials. A simple form of gasifier, used to generate gas from the fuel, is known as a single-stage, fixed bed gasifier. In such a gasifier additional fuel is supplied to the top of a column of fuel supported on a grate at the base of the column. The fuel, in the lower section of the column, is oxidized by the introduction of air at the grate level and the hot gases rising through the overlying column of fuel effects gas formation, by reduction, and releases volatiles from the fuel in the overlying column. Fuel is replenished as needed at the top of the column. The gas generated in the gasifier, along with volatile vapors, are removed from the upper end of the gasifier, at temperatures in the range of about 500° F. to about 1000° F., to be conducted to the operation where it is required for use in a fuel burner.

It is a characteristic of most fuels used for gasification by this process that tar is a distillation product which, while being a combustible source of heat in the gas, condenses at relatively high temperatures in the pipelines, control valves and fuel burners for which the gas is required. The tar, therefore, is removed from the gas stream, as an impediment to the use of the gas, at a location as close as possible to the gasifier as practical. Frequently, the tar so extracted from the gas must be disposed of as an environmentally objectionable waste.

A common procedure for removing the tar involves introducing the hot producer gas into a shower of cold water where the tar is condensed and carried by the water from the condensing spray as a waste product for disposition through some waste disposal process. At times there may be a limited market for its recovery as a commercial grade of coal tar but this market is perhaps only sporadically available. Such a scrubbing removes sensible heat from the producer gas, and the heating value of the tars is lost.

It is an object of the present invention to remove tars from a hot fuel gas to the extent that the tar no longer causes operational problems and at the same time retain most of the sensible heat and calorific value of the original hot fuel gas.

BRIEF DESCRIPTION OF THE PRESENT INVENTION

The present invention provides for utilizing the tar as a valuable source of heat for use in conjunction with the fuel gas while eliminating it as a condensable component of the gas in connection with which it is used. Briefly, this involves the effective removal of a portion of the tar from the gas adjacent the producer, separately burning the tar and returning the resulting hot combustion gases to the fuel gas as a source of sensible heat, which effectively raises the fuel gas temperature above the tar dew point, or alternatively separately burning the condensed tar with an incomplete supply of oxygen to produce hot combustion products in which there are tar-free combustible constituents, as, for example, carbon monoxide and hydrogen, both of which provide both sensible heat to the fuel gas and tar-free caloric fuel value to the fuel gas.

DESCRIPTION OF THE DRAWING

The accompanying drawing is a schematic diagram of a plant for the practice of the invention and in connection with which the invention is described in detail.

DETAILED DESCRIPTION

In the diagram, the circle 1 designates a fixed bed, single-stage gasifier of known construction. The hot product fuel gas from the gasifier flows through pipe 2 to spray chamber 3. The tar content of the gas produced may vary from near zero to more than 10 percent of the original fuel fed to the gasifier. It is often near 6 percent for bituminous coals. In the spray chamber, the gas, containing tar, is intimately contacted with a fine spray of cold water supplied through line 4. The contact of the tar vapor with a fine water spray cools it from a gas or vapor phase to a dispersed liquid phase with the hot gas vaporizing the water. This results in the production of a fog or mist-like suspension of tar and the heat in the spray chamber from the constant stream of incoming hot gas keeps the water above the dew point, since premature condensation of the moisture would produce undesirable aqueous waste. Some small portion of the tar collects on the side walls of the spray chamber. This small fraction of condensed tar is withdrawn through drain pipe 5. The quantity of water is controlled so that all of the water evaporates and the gas temperature is lowered to a point when enough of the tars and oils condense to provide the heat effects hereinafter described.

The heated mixture of fuel gas and fog-like tar flows from the spray chamber through conduit 6 to an electrostatic precipitator 7 where tar is precipitated, by electrostatic discharge, from the flow of gas and water where the water remains combined with the gas as a vapor. About 99% of the mist and dust particles are removed in the electrostatic precipitator. The tar and precipitated small solid particles are removed through pipe 8 leading to a tar pump 9. Pipe 5 from the spray chamber is connected to pipe 8 in advance of the tar pump. The pump 9 supplies the condensed liquid tar from the pump to tar burner 10. Combustion air is supplied to the tar burner. The combustion air supply is indicated in the diagram to be introduced into the burner through supply pipe 11 in which a flow control means, such as an adjustable flow control valve, is provided as indicated at 12. The air supply must be closely regulated to supply no more than the stoichiometric amount of oxygen to the burner, as there must be no free oxygen in the combustion gases which are discharged from the burner.

The hot combustion gases from the tar burner are conducted through conduit 13 to gas mixer 14. Fuel gas and water vapor from the precipitator 7 flow through pipe 15 to this mixer. In the mixer, the tar-free combustion gases from the burner 10 carry a quantity of sensible heat to the mixer. Sensible heat from the burning of the tar is thus combined with the caloric heat of the fuel gas. If the fuel gas from the precipitator still carried a residuum of tar, the heat so supplied to the gases in the mixer prevents any condensation of the tar in the conduits 17 between the mixer and the burner or point of consumption at 18. If desired, a filter or strainer 20 may be used in the outlet conduit from the tar pump 9 so as to remove undesired constituents from the tar fed to the tar burner 10.

While we have referred to supplying the tar burner with a stoichiometric supply of oxygen ($O_2$) in air, it may be desirable to reduce the sensible heat to the mixer by regulating the air supply at 12 to provide less than the amount of oxygen necessary to effect complete combustion. This will result in the product gases from the tar burner carrying some incomplete combustion products as, for example, carbon monoxide and hydrogen. In this case, the gases passing from the burner to the mixer will carry caloric heat with reduced sensible heat, but the caloric heat will be made available when the mixed gases are burned at terminal 18 of the fuel gas system, the caloric heat from the incomplete combustion of the tar supplementing the caloric heat of the fuel gas. Caloric heat, of course, refers to a fuel expressed in terms of potentially available heat and sensible heat as the measurable heat existing at a particular time.

It may be noted that while the water from the spray in the spray chamber remains in the fuel gas, the amount is not sufficient to be regarded as detrimental in the operation in which the fuel gas is burned.

Since the amount of water admitted to the spray chamber can be controlled, the resulting temperature of the gas can be controlled in the range from the initial tar dew point to the water dew point. This, in turn, controls the percentage of tar vapors condensed. Normally, a suitable operating temperature can be found such that no excess heat is liberated in the tar burner and excessive temperatures are not reached in the mixer outlet.

As an alternative to incomplete oxidation of the tar where complete combustion would result in an undesirable excess of sensible heat supplied to the mixer, the tar may be completely oxidized but part of the hot combustion gases flowing to mixer 14 may be diverted through a branch pipe 16 and damper or valve 16' for use in generating steam or other external operation.

A still further way of avoiding excessive heat in the tar burner gases is to provide for the removal of some of the liquid tar through a valved outlet as indicated at 19 in the drawing. The tar so removed is substantially water-free and may be disposed of commercially as an incidental by-product where, for example, the fuel generally supplied to the gasifier is extra rich in tar.

Under typical conditions, the hot fuel gas from the gasifier, at a temperature of about 755° F., will be cooled in the spray chamber to a temperature sufficient to condense about 75-90 percent of the tars and oils from the fuel gas for separation in the electrostatic precipitator. Cooling to a temperature of about 400°-500° F. will be sufficient in most cases. With a high tar loading of the fuel gas from a high volatile bituminous coal, the tar burner would operate with up to a 50 percent deficiency of air for combustion. The mixed gas product will reach a temperature of about 650°-700° F., or about 200°-300° F. above the tar dew point.

The present process thus effects the removal of tar from a tar-bearing fuel gas while retaining the heat values of the gas and the tars for use in a subsequent combustion system.

We claim:

1. In a process of producing a fuel gas which contains condensable tar vapor when it leaves a gasifier, the improvement wherein the tar-bearing gases are treated to remove tar therefrom, comprising:
   (a) continuously conducting hot fuel gas from a gasifier to and discharging it into a spray chamber where the hot tar-bearing gas is contacted with a fine spray of water thereby cooling the tar vapor and evaporating the water to produce a fog-like dispersion of tar in an atmosphere of fuel gas with the temperature in the spray chamber maintained above the dew point of water;
   (b) continuously transferring the fuel gas and said dispersion of tar and water to an electrostatic precipitator and precipitating therein at least most of the condensed tar as a liquid;
   (c) removing the liquid tar so precipitated and conducting at least most of it to a tar burner;
   (d) burning the tar with no more than the stoichiometric supply of oxygen provided by air to produce oxygen-free and tar-free hot combustion gases;
   (e) conducting said hot combustion gases directly into a mixer into which the fuel gas and water vapor flows from the precipitator, thereby adding to the fuel gas the sensible heat of said combustion gases; and
   (f) conducting the mixture so produced to a place of use as a hot fuel gas mixture.

2. The process defined in claim 1 wherein the tar is burned with less than the stoichiometric supply of air whereby the tar-free hot combustion gases resulting from the burning of the tar contain unburned tar-free fuel components such that caloric heat values are mixed into the fuel gas in the mixer in addition to sensible heat.

3. The process defined in claim 1 wherein the quantity of sensible heat provided by the hot combustion gases may be reduced by the controlled removal of a part of the combustion products from the tar burner which are diverted into a heat transfer device for the external utilization of some of the heat other than in said mixer.

4. The process defined in claim 3 where the heat transfer device is of a steam or hot water generating boiler.

5. The process defined in claim 1 in which an excess of heat that would be supplied from the burning of all of the tar removed from the fuel gas stream is avoided by the controlled removal of some of the tar in advance of the burner, for collection as a disposable by-product.

6. The process defined in claim 1 in which incidental condensed tar in the spray chamber is collected and combined with tar removed by the precipitator.

* * * * *